(12) United States Patent
Bruch Pla et al.

(10) Patent No.: US 10,118,336 B2
(45) Date of Patent: Nov. 6, 2018

(54) FORMING THREE DIMENSIONAL OBJECTS

(71) Applicant: HEWLETT-PACKARD DEVELOPMENT COMPANY, L.P., Houston, TX (US)

(72) Inventors: Xavier Bruch Pla, Sant Cugat del Valles (ES); Alejandro Manuel de Peña-Hempel, Sant Cugat del Valles (ES); Ramón Vega Ainsa, Sabadell (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 15/266,176

(22) Filed: Sep. 15, 2016

(65) Prior Publication Data
US 2017/0008232 A1    Jan. 12, 2017

Related U.S. Application Data

(63) Continuation of application No. 13/362,844, filed on Jan. 31, 2012.

(51) Int. Cl.
| | | |
|---|---|---|
| *B29C 64/147* | (2017.01) | |
| *B29C 64/35* | (2017.01) | |
| *B29C 64/386* | (2017.01) | |
| *B33Y 10/00* | (2015.01) | |
| *B33Y 50/02* | (2015.01) | |
| *B29C 64/124* | (2017.01) | |
| *B29C 64/141* | (2017.01) | |
| *B29C 64/153* | (2017.01) | |
| *B29C 64/165* | (2017.01) | |
| *B29C 64/40* | (2017.01) | |
| *B33Y 30/00* | (2015.01) | |
| *B29K 105/00* | (2006.01) | |

(52) U.S. Cl.
CPC .......... B29C 64/147 (2017.08); B29C 64/124 (2017.08); B29C 64/141 (2017.08); B29C 64/153 (2017.08); B29C 64/165 (2017.08); B29C 64/35 (2017.08); B29C 64/386 (2017.08); B29C 64/40 (2017.08); B33Y 10/00 (2014.12); B33Y 50/02 (2014.12); *B29K 2105/256* (2013.01); *B33Y 30/00* (2014.12)

(58) Field of Classification Search
CPC . B29C 64/141–64/153; B29C 64/165–64/182; B33Y 50/02; G01B 17/025
USPC .................................. 118/712–714; 427/9–10
See application file for complete search history.

(56) References Cited

U.S. PATENT DOCUMENTS

| | | | |
|---|---|---|---|
| 4,436,251 A | | 3/1984 | Deyesso |
| 5,094,935 A | * | 3/1992 | Vassiliou .............. B29C 64/141 156/58 |
| 7,284,842 B2 | | 10/2007 | Houben |
| 8,880,209 B2 | * | 11/2014 | Yasukochi .......... B29C 67/0066 700/119 |

(Continued)

FOREIGN PATENT DOCUMENTS

| | | |
|---|---|---|
| TW | 201109097 A | 3/2011 |
| WO | WO-2011011818 A1 | 2/2011 |

*Primary Examiner* — Dah-Wei D. Yuan
*Assistant Examiner* — Jose Hernandez-Diaz
(74) *Attorney, Agent, or Firm* — Fabian VanCott

(57) ABSTRACT

A three dimensional object may be formed by forming voxels on a sheet of material and positioning the voxels together to form the three dimensional object by rolling up the sheet.

19 Claims, 5 Drawing Sheets

(56) References Cited

U.S. PATENT DOCUMENTS

| | | | |
|---|---|---|---|
| 2003/0226928 A1* | 12/2003 | McNeil | B65H 23/198 242/413.2 |
| 2006/0054039 A1* | 3/2006 | Kritchman | B29C 41/02 101/424.1 |
| 2010/0007692 A1 | 1/2010 | Vanmaele et al. | |
| 2011/0249048 A1 | 10/2011 | Gullentops et al. | |

* cited by examiner

FORMING THREE DIMENSIONAL OBJECTS

BACKGROUND

Additive manufacturing involves adding materials together, layer upon layer, until a three dimensional object is completed. There are a variety of different types of additive manufacturing involving systems that selectively deposit material to build the desired object and systems that selectively solidify parts of a layer of a build material to build up the desired object.

Three dimensional printing includes relatively new forms of additive manufacturing that incorporate the advantages of digital processing. In three dimensional inkjet printing, liquid binder is injected into successive layers of powder to form successive cross sections of the three dimensional object, one layer at a time. Each layer is created on top of the preceding layer until the object is completed.

In another three dimensional printing approach, digital light processing involves hardening a liquid polymer layer positioned between a base plate immersed in the liquid and digitally controlled lights. The liquid superjacent the base plate is exposed to a digitally controlled pattern of lights that harden the liquid into the pattern. The plate incrementally moves deeper into the liquid allowing new liquid to flow over the hardened polymer. Another pattern from the lights hardens the new layer. The process repeats itself by forming a new layer during each repetition.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The present specification describes principles including, for example, a method for forming a three dimensional object. Examples of such a method may include forming voxels in a sheet of material and positioning the voxels together to form the three dimensional object by rolling up the sheet.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Figure 1:
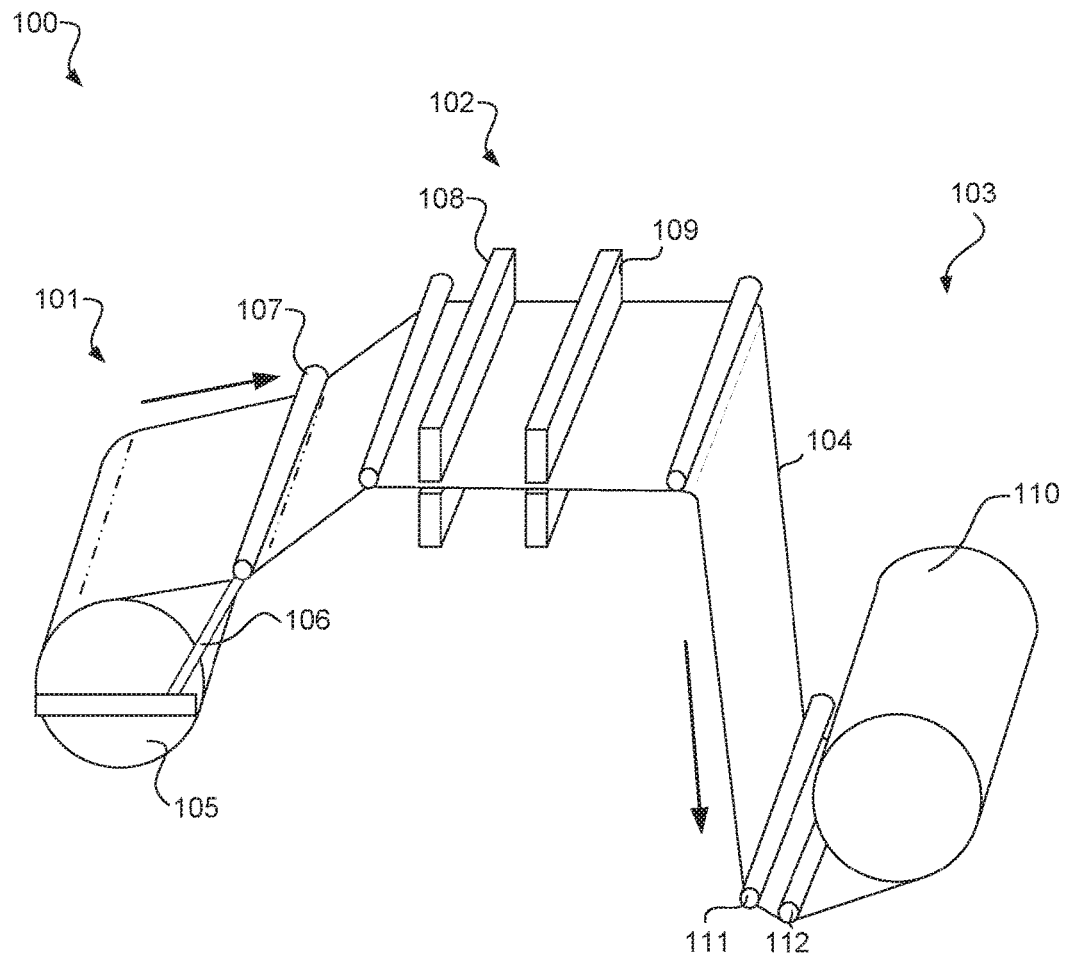
FIG. 1 is a diagram of an illustrative system for forming a three dimensional object, according to principles described herein.

FIG. 1 is a diagram of an illustrative system (100) for forming a three dimensional object. The system (100) comprises an intake station (101), a voxel forming station (102), and a rolling station (103). A flexible sheet (104) of material is fed into the system (100) through the intake station (101), conveyed though the voxel forming station (102), and rolled up in the rolling station (103).

The intake mechanism may comprise an intake roll (105) that supports a reel of sheet material. An alignment bar (106) may be used to align the sheet sections before they enter the voxel forming station (102). A tensioning unit (107) may be used to keep the sheet sections taut or adjust the tension of the sheet sections according to the system's specifications.

The voxel forming station (102) includes an activation mechanism (108) that hardens or cures discrete cross sections of the sheet as the sheet material is conveyed through the station. In alternative examples, the voxel forming station deposits voxel material onto a surface of the sheet that hardens on the surface to become a voxel. Also, the voxel forming station (102) may comprise a coloring mechanism (109) that adds color to the voxels.

The placement of the voxels may be determined by a controller that has access to a three dimensional model. For example, a CAD file or other three dimensional model files may be stored on a local computer or transmitted over a network.

The rolling station (103) may spirally position the voxels adjacent one another as the sheet is rolled up. The spiral positioning of the voxels may result in forming a desired three dimensional object in the rolled up section (110) that resembles the three dimensional model. The voxels may comprise surface characteristics that cause the voxels to cohere to one another without adhering to the residual, non-hardened sheet material. In some examples, the rolling mechanism increases an internal pressure of the rolled up section (110) as the rolled up section's diameter increases. The internal pressure of the rolled up section (110) may contribute to voxel cohesion.

After the rolling station positions the voxels, the residual material, such as the material of sheet that was not used to form voxels or is not supporting material deposited to form a voxel, may be removed from the rolled up section. The removal process may include mechanical, chemical, and/or thermal processes to remove the residual material.

Accurate spiral positioning of the voxels may be ensured by any of several cooperating devices. Proper spiral positioning of the voxels may be promoted by coordinating the rolling speed of a rolling motor, precise tensioning through tension rollers (111, 112), and voxel formation spacing by the activation mechanism in the voxel forming station (102).

Figure 2:
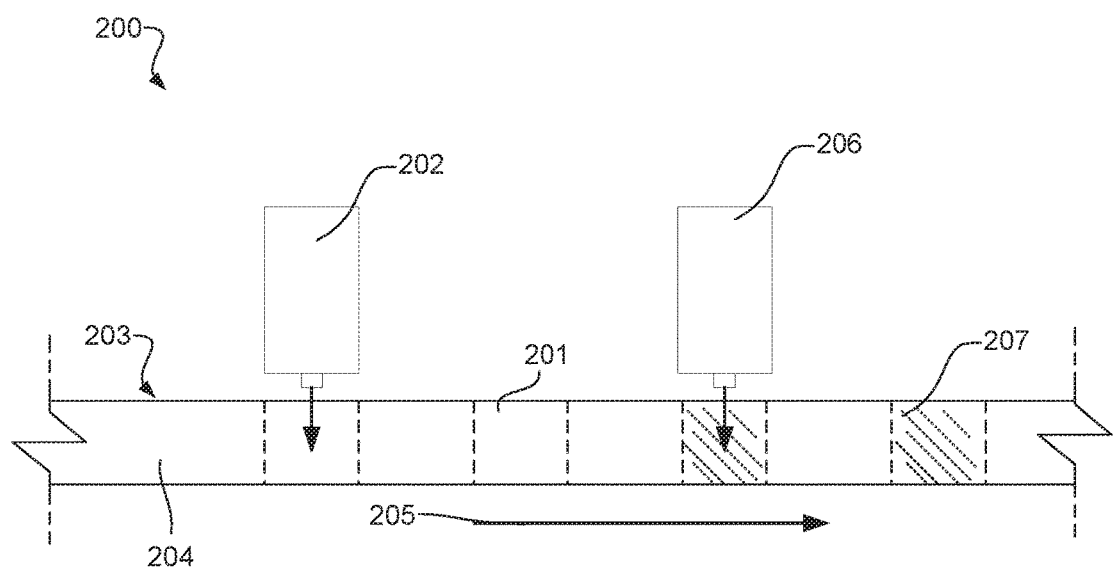
FIG. 2 is a diagram of an illustrative mechanism for forming voxels, according to principles described herein.

FIG. 2 is a diagram of an illustrative mechanism (200) for forming voxels (201) in or on a sheet of material as described above. In FIG. 2, an activation mechanism (202) is positioned proximate a surface (203) of the sheet (204). The activation mechanism may be a source of an activation medium that comprises a characteristic that causes a material of the sheet to harden locally where the activation medium is applied.

For example, the sheet may comprise a film of polymers that hardened when exposed to certain types of light. The activation mechanism may comprise a light source and a light guide that guides light from the source into discrete cross sections of the film. As the discrete cross sections are exposed to the light, the volume of sheet material within the exposed cross section hardens forming a voxel of hardened material.

In other examples, the sheet may comprise a support layer underneath a powder layer. The activation mechanism may comprise a liquid binder source and a dispensing nozzle that may deposit the binder onto the powder layer at discrete locations. The deposited binder may seep into the powder layer and solidify the powder, for example, glue a section of the powder together.

In some examples, the support layer may comprises features that hold the powder layer firmly in place, such as a side lip that prevents powder from slipping off an edge of the sheet. Further, in examples that include a powder layer, the tension units and rollers of the system that provide tension to the sheet may be arranged to keep the sheet flat until the sheet reaches the rolling station so that no powder is spilled from the sheet. The tension on the sheet may provide sufficient internal pressure on the powder layer to hold the powder in place while the sheet is rolled up. Further, in other examples that incorporate a powder layer, the powder may be not be on the initially-rolled sheet, but is continuously deposited and uniformly spread just ahead of the voxel forming station.

In other examples, the activation medium may use energy in forms such as light, heat, lasers, ultraviolet light, infrared light, radiation, x-rays, visible light, microwaves, gamma rays, nuclear particles, or combinations thereof that have the effect of hardening material in or on the sheet into a voxel of an object being formed using the sheet. The voxel forming material may be a powder, a gel, a liquid, a slurry, a film, or combinations thereof. Additive manufacturing techniques, such as fluid deposition modeling, piezo thermal inkjeting, sintering laser systems, or combinations thereof may also be suitable with the principles described herein.

In some examples, the voxel forming station may apply an opaque material to the surface of the voxel forming material in a pattern that covers discrete cross sections of the sheet while exposing others. As the sheet is conveyed through the voxel forming station, the exposed areas are cured with a light, liquid, laser, or other activation medium, such that the exposed areas are hardened while the covered areas are unaffected. The opaque material may be removed during the removal process in a subsequent stage.

In examples that incorporate sheets with multiple layers, such as a support layer underneath a voxel forming layer, the support layer may comprise characteristics that allow for easy removal during the removal stage. For example, the support layer may be water soluble or easily evaporated.

The sheet may be continuously fed through the system. Thus, the sheet's material may be continuously moving through the voxel forming station in the direction indicated by arrow (205). In some examples, the sheet is moved in increments. In such examples, the conveying system may pause its forward movement while the activation mechanism forms each row of voxels. A voxel formation time may determine the speed that the material is conveyed through the system.

In some examples, the activation mechanism may initiate voxel formation as the activation mechanism is hovered over the discrete voxel locations, and the voxel formation may continue as the sheet is conveyed. For example, the activation medium may be infrared light that heats each discrete cross section. However, the heat may require a definite amount of time to fully cure the voxel. Depending on the curing time and the sheet's conveyance speed, at least a portion of the curing may occur after the discrete locations are conveyed forward.

In some examples, the sheet may be conveyed forward and backwards. For example, the sheet may be moved backwards if the activation mechanism may requires several passes to fully form a row of voxels, but the curing process requires a waiting period between each pass. The activation mechanism may initiate the formation of several rows before the rows are moved back for an additional pass.

In some examples, where several passes are desirable, multiple rows of activation mechanisms may be spaced along the length of the voxel forming station. In some examples, this array of activation mechanisms may span the entire width of the sheet of material. In other examples, one or more activation mechanisms may be arranged to move laterally across the width of the sheet on a carriage. One or more activation mechanisms on a carriage may also be configured to move along the length of the sheet.

The size of the voxel will determine the final object's resolution. The thickness of the voxel forming layer (or the entire thickness of the sheet, if the entire thickness is composed of voxel forming material) is a parameter that affects voxel size. A thinner cross section may provide a higher resolution. In some examples, the thickness of the voxel forming material may be five micrometers to several centimeters. In some examples, the thickness may be from twenty five micrometers to 350 micrometers.

The size of the activation mechanism may also affect voxel size, and therefore, the resolution. The smaller the portion of the voxel forming material that the activation mechanism can selectively solidify, the higher the resolution of the voxels in the resulting object. However, smaller voxels may require the formation of more voxels to provide the desired size of the resulting three dimensional object. Forming a larger number of voxels to increase resolution will also likely increase processing time.

A coloring mechanism (206) may be located upstream or downstream of the activation mechanism (202). The coloring mechanism may supply a pigment, dye, fine powder, or other substance that creates colored voxels (207). The coloring mechanism may comprise a plurality of colors and a plurality of dispensers. In some examples, the coloring mechanism (206) comprises dispensers dedicated to each of the primary colors that add appropriate amounts of their color to each voxel.

In some examples, the activation mechanism may subject the sheet's material to the activation medium and a coloring substance at the same time. For example, a binder may be colored or a coloring substance may be injected into a gel as the gel is exposed to light.

In some examples, color is only added to the voxels that are destined to form the outside of the three dimensional object to preserve coloring for those parts of the three dimensional object that will be viewable. In some examples, the three dimensional object may comprise colored voxels within a predetermined surface depth to avoid exposing uncolored voxels when the object is scratched.

Figure 3:
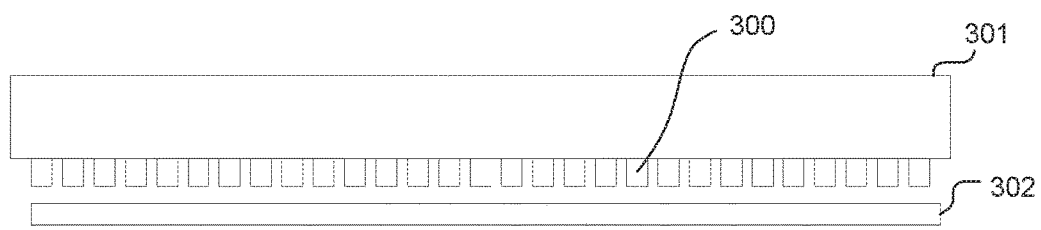
FIG. 3 is a diagram of an illustrative mechanism for forming voxels, according to principles described herein.

In the example of FIG. 3, a plurality of activation mechanisms (300) are supported by a support bar (301) that spans a width of the sheet (302). In some examples, the voxel forming station may utilize a plurality of support bars (301) to provide a plurality of rows of activation mechanisms.

The activation mechanism may be positioned proximate to the sheet in any manner that allows the activation mechanism to form voxels. In some examples, the activation mechanism may be positioned to the side of the sheet, under the sheet, angled with respect to a surface of the sheet or combinations thereof. In examples that incorporate forming voxels by passing energy through the thickness of the sheet's material, a target may be positioned to absorb or redirect the energy after the energy passes through the sheet.

Figure 4:
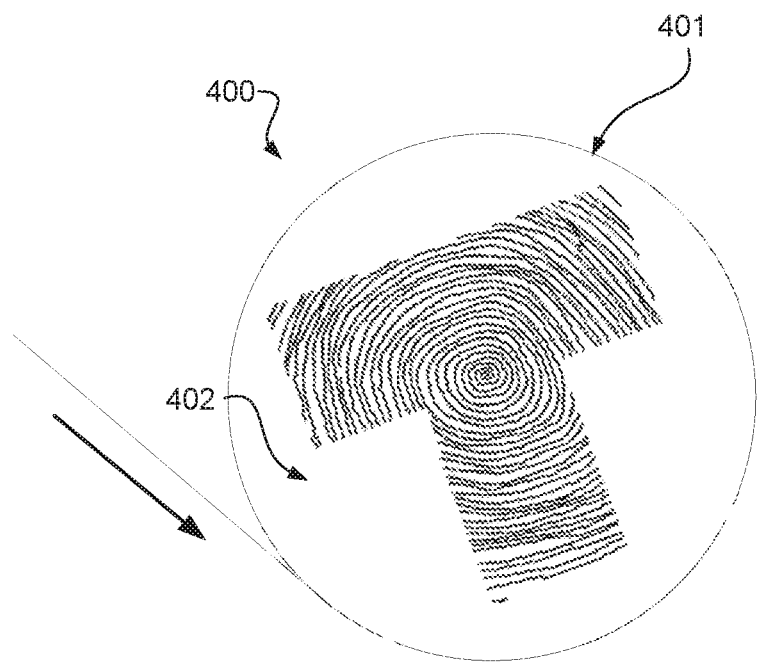
FIG. 4 is a diagram of illustrative voxels rolled together, according to principles described herein.

FIG. 4 is a diagram of illustrative voxels rolled together in a rolled up section (400) of the sheet. For illustrative purposes, the darkened portions (401) represent portions that comprise voxels, while the empty space (402) represents portions of residual material within a single cross section of the rolled up section. As the rolling station rolls up the sheet, the voxels are spirally positioned adjacent one another to form the three dimensional object. In the example of FIG. 4, the voxels collectively form a "T" shaped three dimensional object that is viewable in the rolled up section's cross section.

The spiral positioning of the voxels determines the voxel row spacing during the voxel forming station. The voxels spirally positioned near the center of the three dimensional object are the first voxels formed on the sheet.

A tension on the sheet (403) may determine the internal pressure within the rolled up section, which may gradually increase towards the rolled up section's center. The internal pressure may contribute to voxel cohesion.

A rolling mechanism may include a motor that rotates an axle that is connected to an end of the sheet. The axle comprises a sufficient size and strength to support the weight of the rolled up section as well as to provide sufficient tension on the sheet. The system may comprise adjustment mechanisms that may adjust the tension on the sheet and thereby adjust the tightness of the rolled up section's windings.

Figure 5:
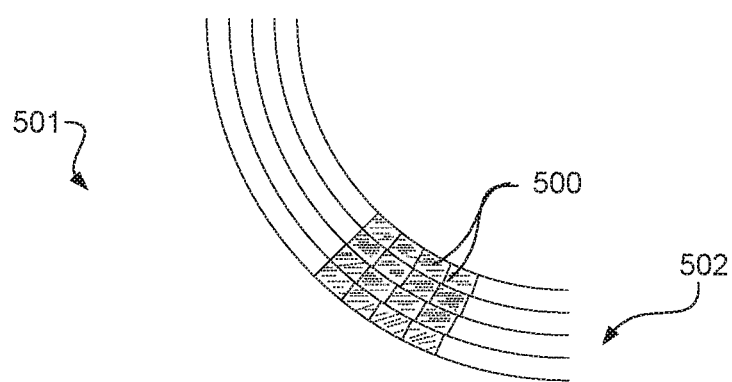
FIG. 5 is a diagram of illustrative voxels, according to principles described herein.

FIG. 5 is a diagram of illustrative voxels (500) within the rolled up section (501). The voxels (500) may comprise a surface characteristic that causes the voxels to stick or cohere to one another. For example, a binder located in voxels may cohere to other voxels. Each successive layer (502) of the voxels may place the voxels adjacent each other. Voxel cohesion may occur between voxel rows and columns as well as voxels cohering to neighboring voxels.

The voxels (500) may be formed in any suitable shape. For example, the voxels may be uniformly shaped. Each voxel may comprise a symmetric shape, asymmetric shape, cubic shape, columnar shape, polygonal shape, curved shape, or combinations thereof. In some examples, the voxels comprise a shape conducive for being stacked in a spiral arrangement.

Voxel formation may occur on a substantially flat surface of the sheet during the voxel forming stage, and the voxels and residual sheet material may be subjected to bending forces as the sheet is rolled up. Such bending forces may form gaps between the voxels and/or residual material. In some examples, the internal pressure of the rolled up section is sufficient enough to morph the voxels' shapes to fill these gaps. In some examples, the system continues to roll up residual sections of the sheet after the three dimensional object is spirally arranged to subject the outer voxels to sufficient internal pressure. In some example, the voxel rows are spaced apart to accommodate for voxel movement under a desired internal pressure. However, alternative examples may subject the voxels to a minimal internal pressure.

In some examples, heating may cause the voxels to stick together. In some examples, heating the voxels in combination with the rolled up section's internal pressure may fuse voxel surfaces together making the three dimensional object a single unit. The heating may occur while the rolled up section remains connected to the rolling station. However, in alternative examples, the rolled up section may be placed in an oven or other environment to cause the voxels to fuse together. In some examples, a procedure that fuses the voxels together simultaneously removes residual material. In some examples, the three dimensional object is cured as the residual material is removed.

Figure 6:
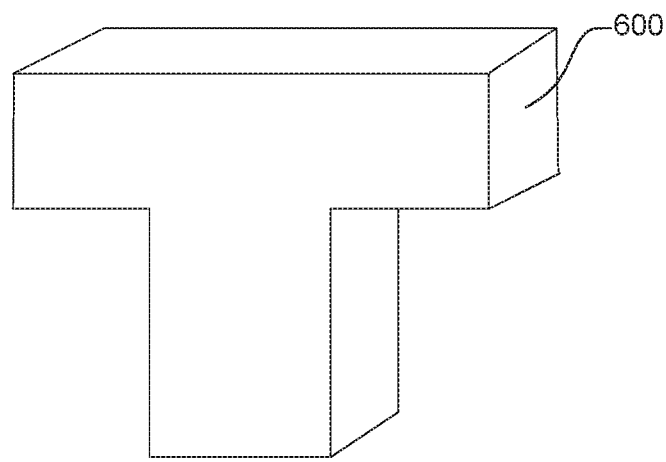
FIG. 6 is a diagram of an illustrative three dimensional object, according to principles described herein.

FIG. 6 is a diagram of an illustrative three dimensional object (600) after residual material is removed. A removal process may remove the residual material that remains unaffected by the activation mechanisms. In examples that incorporate a support material positioned underneath the voxel forming material, the support material may also be removed from the rolled up section. In some examples, the process for removing residual voxel forming material and support material is the same, but alternatively, different removal processes may be employed to remove different materials of the sheet.

In some examples, the removal process may include a mechanical process that includes rotary brushes, liquid jet nozzles, picks, or other mechanical mechanisms to displace the residual material.

The removal process may comprise a chemical process that includes dissolving the residual material by applying a solvent to the rolled up section. The solvent may be liquid, gas, or solid that is applied to the rolled up section until the residual material is removed. In some examples, the rolled up section is immersed in the solvent. Other chemical processes may include the application of a substance that chemically reacts with the residual material by turning the residual material into a liquid or gas. In some examples, the removal process may include a thermal mechanism that melts and/or evaporates the residual material.

In thermal and/or chemical removal processes, temporary ventilation may be formed in the three dimensional object to ensure that pockets of residual material buried in the rolled up section are freed during the removal process. The ventilation may be formed after the three dimensional object is created by mechanisms such as drilling ventilation holes or otherwise forming ventilation pathways in the object. Also, ventilation pathways may be intentionally formed during the additive manufacturing process by the system's voxel spacing. In some examples, the ventilation pathways and/or holes are back filled after ventilation. In alternative examples, ventilation holes or pathways may remain open. In some examples, a ventilation hole may be provided in the space that the remains after a support axle of the rolled up section in removed.

Figure 7:
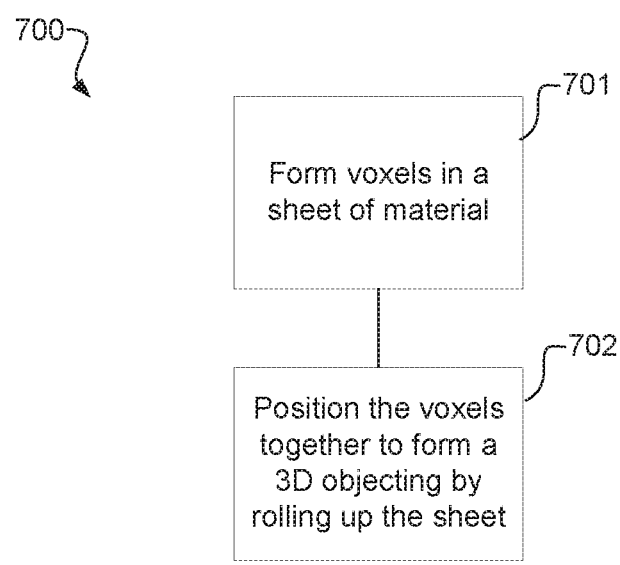
FIG. 7 is a diagram of an illustrative flowchart for forming a three dimensional object, according to principles described herein.

FIG. 7 is a diagram of an illustrative flowchart of a method (700) for forming a three dimensional object that includes forming (701) voxels in a sheet of material and positioning (702) the voxels together to form the three dimensional object by rolling up the voxels. As noted above, the residual material may be removed from the sheet after the object is formed.

Figure 8:
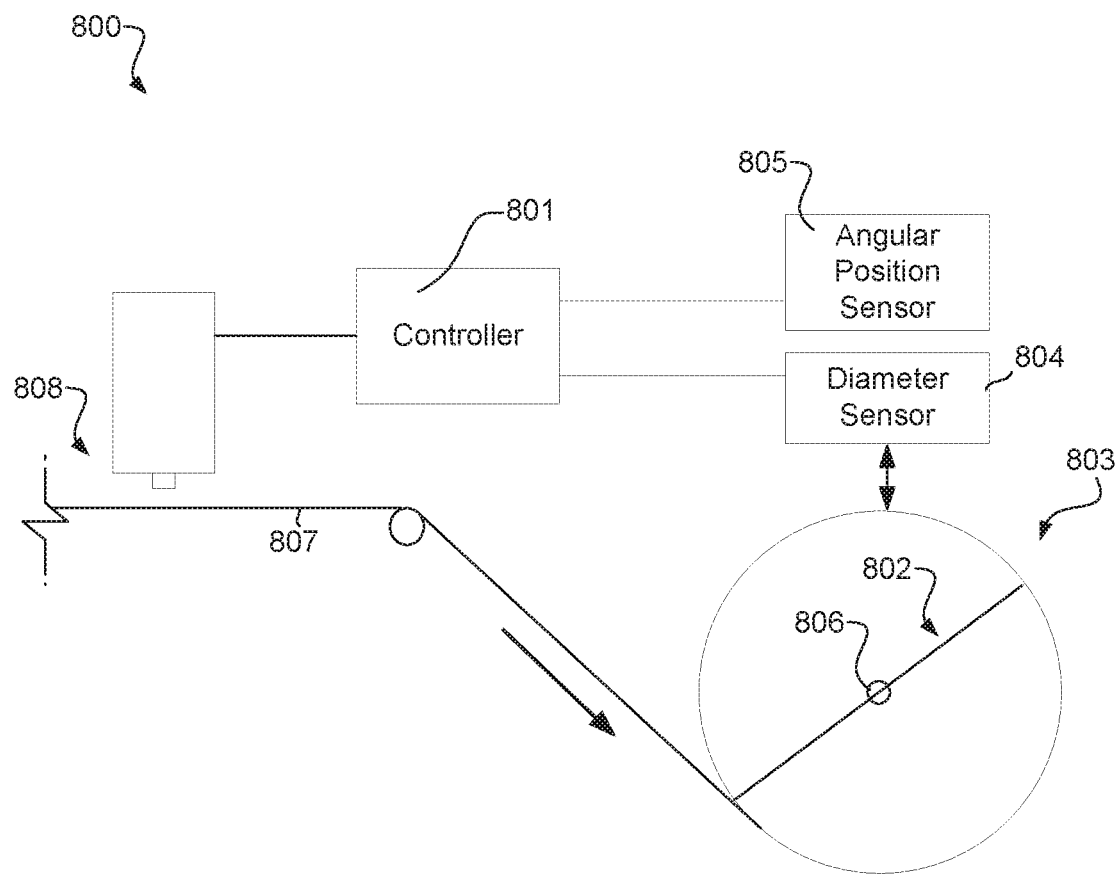
FIG. 8 is a diagram of an illustrative system for forming a three dimensional object, according to principles described herein.

FIG. 8 is a diagram of an illustrative system (800) for forming a three dimensional object. The illustrated system (800) incorporates a controller (801) that may adjust parameters of the system during the manufacturing process. Sensors may be incorporated throughout the system to provide feedback to the controller (800). A non-exhaustive list of sensors that may be employed with a manufacturing system according to the principles described herein may include calipers, odometers, strain gauges, thermometer, pressure gauges, density measurement devices, scales, optical recognition devices, and combinations thereof.

For example, the diameter (802) of the rolled up section (803) may increase during the manufacturing process. The diameter size may affect the voxel row spacing, bending forces on the voxels as they are rolled up, the angle that the sheet is rolled onto the rolled up section, the tension on the sheet, and the speed that the sheet is conveyed through the system. A diameter sensor (804), such as a caliper, may continuously measure the rolled up section's diameter and provide the measurements to the controller (801) to make real time adjustments.

Also, an angular position sensor (805), such as an encoder, may be in communication with the rolled up section's axle (806) and may provide real time information to the controller. The speed of the motor and the diameter of the rolled up section may determine the speed that the sheet (807) is conveyed through the voxel forming station (808). Thus, the controller may continuously adjust the motor's output to keep the sheet's conveyance consistent. In some examples, the controller may speed up the voxel forming activities to accommodate changes in the conveyance speed.

Further, the controller may compare the rolled up section's diameter changes to parameters that the controller would expect the diameter to be under the system's operating parameters. If the controller finds a mismatch between the real time parameters and expected parameters, the controller may run a diagnostic on the system to determine if there is a failure. If the mismatch is significant enough, the controller may shut down the entire system until the issues are resolved.

An additive manufacturing system according to the principles herein may create three dimensional objects rapidly. In examples that use a 100 micrometer thick voxel forming material that is conveyed at 0.2 meters per second, the build time for a cube of twenty cm by twenty cm by twenty cm may be less than thirty minutes.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of forming a three dimensional object, comprising:
   unrolling a sheet of material from an intake roll;
   feeding the sheet of material to a voxel forming station;
   in the voxel forming station, selectively activating voxels in or on the sheet of material such that a portion of the sheet or material on the sheet is activated and leaving a second portion of the sheet or material on the sheet unactivated, wherein the activated portion has different mechanical properties than the unactivated portion;
   rolling up the sheet under dynamic tension to form the three dimensional object, wherein tension applied to the sheet varies depending on the mechanical properties of the sheet resulting from the presence of activated and unactivated voxels in the sheet; and
   removing the unactivated portion to reveal the three dimensional object by mechanical, chemical, and/or thermal processes.

2. The method of claim 1, further comprising monitoring a diameter of the rolled up sheet and comparing the monitored diameter with a calculated diameter.

3. The method of claim 1, further comprising coloring a subset of voxels.

4. The method of claim 3, wherein the coloring include applying a plurality of colors.

5. The method of claim 4, wherein the coloring is applied to voxels intended to form a surface of the three dimensional object.

6. The method of claim 1, further comprising aligning sections of the sheet of material with an alignment bar before the sections of the sheet are fed into the voxel forming station.

7. The method of claim 1, further comprising increasing an internal pressure of a rolled up section of the sheet as the diameter of the rolled up section increases to contribute to voxel cohesion.

8. The method of claim 1, further comprising:
   depositing voxel material on the sheet at the voxel forming station; and
   then selectively activating voxels in the deposited material on the sheet.

9. The method of claim 8, wherein the deposited material comprises a powder and the method further comprises preventing powder from slipping off an edge of the sheet with a side lip of the sheet.

10. The method of claim 1, further comprising moving the sheet both forwards and backwards with respect to the voxel forming station where an activation mechanism needs multiple passes to fully form a row of voxels.

11. The method of claim 10, further comprising curing voxels being formed between passes through the voxel forming station.

12. The method of claim 1, wherein the voxel forming station uses an array of activation mechanisms that span an entire width of the sheet.

13. The method of claim 1, further comprising rolling up additional sections of the sheet after the three dimensional object is spirally arranged so as to apply pressure to outer voxels of the three dimensional object.

14. The method of claim 1, further comprising heating the rolled sheet to cause the voxels to adhere together.

15. The method of claim 14, further comprising using both heat and pressure from the tension of the rolled sheet to fuse voxel surfaces together.

16. The method of claim 1, further comprising forming ventilation in the three dimensional object to allow pockets of residual material buried in the rolled up sheet to be removed.

17. The method of claim 16, wherein forming ventilation comprises drilling ventilation holes.

18. The method of claim 16, wherein forming ventilation comprises forming ventilation pathways between voxels during voxel formation.

19. The method of claim 1, further comprising removing the unactivated portion to reveal the three dimensional object.

* * * * *